United States Patent [19]

Voegele

[11] 4,342,532
[45] Aug. 3, 1982

[54] ADJUSTABLE GRAIN SPREADER

[76] Inventor: William H. Voegele, R.R. #5, Bismarck, N. Dak. 58501

[21] Appl. No.: 169,436

[22] Filed: Jul. 16, 1980

[51] Int. Cl.$^3$ .............................................. B65G 65/32
[52] U.S. Cl. .................................... 414/299; 193/2 R
[58] Field of Search ............... 414/160, 205, 206, 299, 414/293, 301; 193/3, 2 R, 17; 239/650, 665

[56] References Cited

U.S. PATENT DOCUMENTS

| | | | |
|---|---|---|---|
| 655,552 | 8/1900 | Gorton | 414/206 |
| 796,784 | 8/1905 | Witherbee et al. | 414/205 |
| 3,248,117 | 4/1966 | Donelson | 414/300 X |

*Primary Examiner*—Robert G. Sheridan
*Attorney, Agent, or Firm*—Robert E. Kleve

[57] ABSTRACT

A grain spreader having a plurality of channels pivotally mounted at their upper ends to said cone. The spreader has adjustment means to simultaneously pivot said channels inwardly about their pivotal mounting to a size where they may be received through a center opening. The device also has means to mount said device in said bin. The adjustment means can then be operated to pivot said channels outwardly to place the outer ends of the channels near the outer edge of the bin. The center cone deflects some grain emptied onto the cone onto the channels where it will be carried by the channels to the outer edge of the bin to deposit grain near the outer edge of the bin.

2 Claims, 4 Drawing Figures

ADJUSTABLE GRAIN SPREADER

This invention relates to grain dividers, more particularly, the invention relates to grain dividers for grain bins to spread the grain outward toward the outer edge of the bin.

It is an object of the invention to provide a novel grain divider or spreader which has a plurality of channels which may be retracted together simultaneously to allow the spreader to be inserted into the bin and it has an adjustable plate to simultaneously spread the channels outward once in the bin so that grain poured onto the center of the spreader will spread outward toward the outer edges of the bin traveling along the channel.

It is another object of the invention to provide a novel grain spreader with a plurality of channels which may be retracted to simultaneously insert the spreader into the bin which can be extended outwardly simultaneously once in the bin and which has a central deflecting cone to deflect the grain onto the channels to carry the grain toward the outer edges of the bin.

Further objects and advantages of the invention will become apparent as the description proceeds and when taken in conjunction with the accompanying drawing wherein.

Briefly stated, the invention comprises a grain spreader having a plurality of channels normally mounted to retract together and spread apart, movably mounted adjustment means to simultaneously spread the channels apart and allow the channels to retract toward one another, means to mount the spreader within the bin, whereby the adjustment means may move the channel member toward one another so that they may be inserted into the grain bin through its center opening and attached to the grain bin by the mounting means, and the adjustment means may be moved in an opposite direction to spread the channels at their lower ends apart, a deflecting cone mounted to the said spreader near the top of the channels to deflect some of the grain emptied onto the cone through the center opening in the bin onto the channels where it will be carried by the channels and dropped off at the outer lower ends of the channels near the outer edge of the bin.

Figure 1:
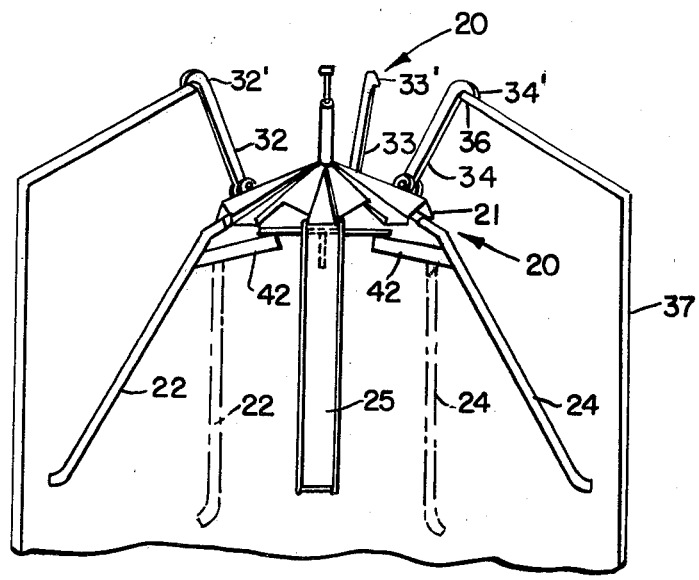
FIG. 1 is a side elevational view of the spreader shown mounted within a conventional grain bin.
Figure 2:
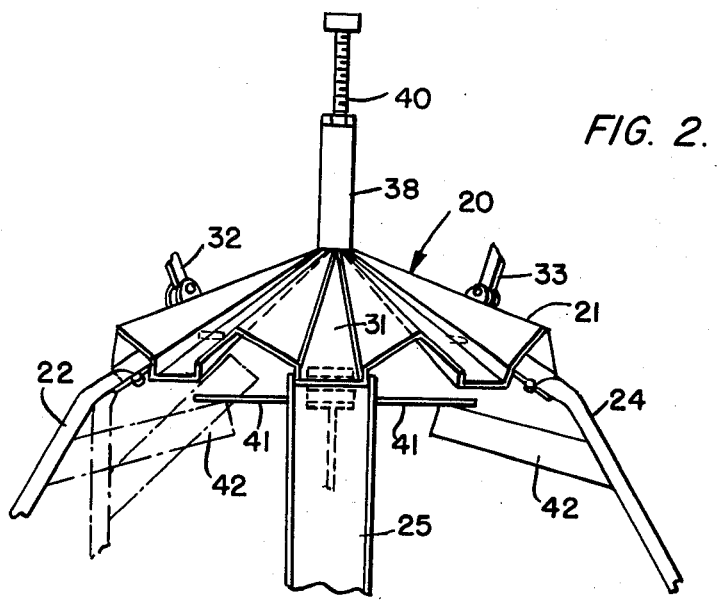
FIG. 2 is an enlarged fragmentary side elevational view of the spreader.
Figure 3:
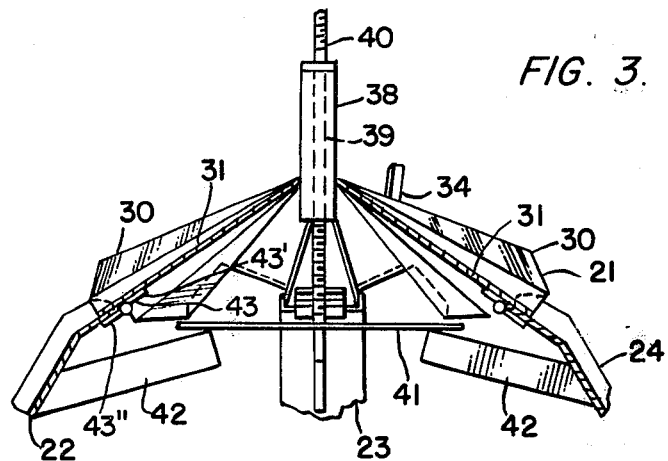
FIG. 3 is a cut away side view of the grain spreader or divider.
Figure 4:
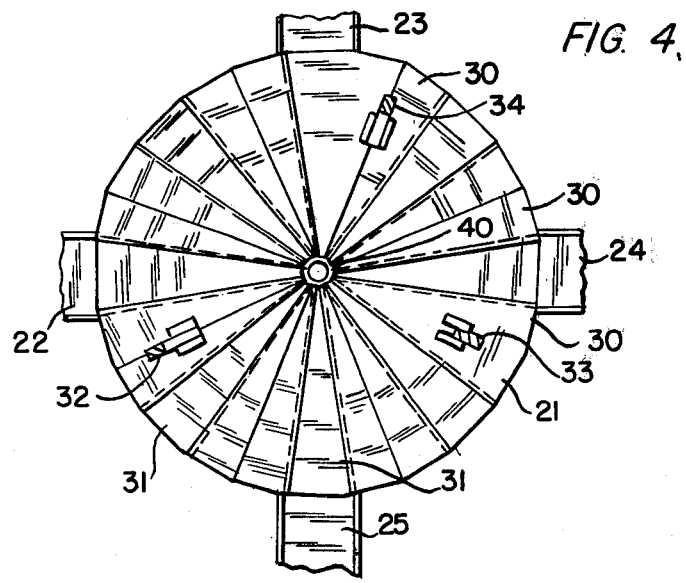
FIG. 4 is a top plan view of the grain divider.

Referring more particularly to the drawing, in FIG. 1, the grain spreader device or invention 20 is illustrated as having a center cone 21 with a plurality of channels 22, 23, 24 and 25 pivotally mounted to the cone at the upper ends 26, 27, 28, and 29. The center cone is made of a metal plate having a plurality of raised ridges 30 which extend radially outwardly within channels 31 extending radially outwardly between each ridge with the movably mounted channels mounted in radial alignment with the cone channels, whereby grain will travel along the cone channels out the movable channels.

A plurality of levers 32, 33, and 34, pivotably mounted to the cones at their lower ends, with hooks 32', 33' and 34' at their upper ends to hook onto the edge 36 of the bin 37 about the center opening 36' of the bin to mount the spreader to the bin as illustrated in FIG. 1.

A center mounting post 38 is fixed to the center of the cone 21 and has a threaded bore 39 therethrough. A screw 40 is threaded into the bore 39 in the post and a plate 41 is mounted to the screw 40 at its lower and in fixed relation to the screw, whereby turning the screw in one direction raises the screw and thereby raises the plate 41, with the raising of the plate allowing the lever arms 42 fixed to each of the channels and the channels to pivot inwardly toward one another toward their position illustrated in dashed lines in FIG. 1.

The turning of the screw 40 in the opposite direction lowers the plate 41 thereby lowering the plate to engage and move downward against the lever arms 42, with the downward movement of the plate 41 against the lever arms 42 causing the lever arms to pivot radially outward and the channels 22, 23, 24, and 25 fixed to the lever arms to pivot radially outward about their pivotal mountings 43 to their position shown in solid lines in FIG. 1.

The operation of the grain spreader device 20 is as follows:

Before inserting the spreader into the opening in the bin, the screw 40 will be turned in a direction to raise the screw to thereby raise a plate 41 to allow the channels 22, 23, 24, and 25 to pivot inwardly toward one another so that they are close enough to one another to allow the spreader to be inserted through the center opening 36' in the bin 37. The spreader will be hooked or mounted to the bin by hooking the hook members 32', 33', 34' and 35' on the outer edge of the bin about the center opening in the bin, as illustrated in FIG. 1.

Then, the screw 40 will be turned in an opposite direction to cause the screw 40 to move downward in the post, thereby lowering the plate 41 with the plate engaging the arms on the channel member to push the arms 42 downward thereby pivoting the channel members 22, 23, 24, and 25 radially outward simultaneously until the lower ends of each of the channel members are near the outer edge of the bin within the bin, as illustrated in FIG. 1.

A locking nut may be threaded downward on the screw against the post to lock the screw in this position.

Whereupon, grain from a grain spout may be poured or emptied onto the center cone 21 where some of the grain will travel down the channel member of the cone and out the pivoted channel members 22, 23, 24, and 25 and travel along channels off the lower outer ends of the channels near the outer edges of the bin, within the bin. Some of the grain emptied onto the center cone will be deflected off the ridges and channels not having the pivoted channel and will drop into the bin near the center of the bin.

The spreader will act to carry or spread some of the grain near the outer edge of the bin and some of the grain near the center of the bin, within the bin, thereby more evenly mixing up the grain as it is introduced into the bin from the chute.

It has been found that wet grain, for example, unless carried to the outer edges of the bin by the channel members, because of its heavy weight, will drop near the center of the bin and thus the wet grain will be concentrated in the center of the bin where it tends to deterbrate.

By spreading the wet grain more evenly about the bin along the outer edge within the bin as well as near the center of the bin, within the bin, it has been found that the grain tends to dry more rapidly and not deteriorate as quickly and then can be stored for a longer period of time with less deterioration and damage to the grain.

Additional channels may be mounted to the channel portions between the pivoted channels illustrated, if desired, to carry more of the grain to the outer edges of the bin. Also the lower ends of the channels may be flared outward, if desired.

A plurality of hinges 43 have one plate portion 43' fixed to the bottom of the channel portion of the cone and a pivoted plate portion 43" which pivots relative to the one plate portion and is fixedly mounted to the pivoted channel member to provide a pivotal mounting for each pivotal channel member.

Thus it will be seen that a novel grain spreader device has been provided which will simultaneously move the grain channel members inwardly and outwardly rapidly by means of turning a single screw member so that the size of the spreader can be made small enough to introduce the spreader into the bin through the center opening in the bin. Thereafter the channel may be spread outwardly rapidly and simultaneously so that they will carry the grain to the outer edge of the bin within the bin with hooks to attach a spreader to the bin about the center opening rapidly.

It will be obvious that various changes and departures may be made to the invention without departing from the spirit and scope, and accordingly it is not intended that the invention be limited to that specifically described in the specification or as illustrated in the drawing, but only as set forth in the claims.

What is claimed is:

1. A grain spreader apparatus comprising a cone having a reduced upper end and tapered outward and downward with an enlarged lower end, said cone having radial extending recessed channels with raised converging portions therebetween, a plurality of pivoted channels each having its one end pivotally mounted to the lower end of the cone in the recessed channels of the cone to provide an extension for the recessed channels in the cone, said pivoted channels pivoting radially inward and outward from the cone, a central plate mounted beneath the cone, means to raise and lower the plate, said pivotal channels extending downward over the outer edges of said plate, said pivoted channels having projecting lug means on the pivoted channels, projecting hook means mounted to said cone to mount said cone in a center upper opening of a grain bin, whereby grain may be poured through the opening in the grain bin onto the cone and directed by the converging portions of the cone into the recessed channels of the cone, with the recessed channels directing the grain onto the pivoted channels where the grain will travel off the outer end of the pivoted channels, said plate means when raised and lowered by said raising and lowering means engaging said lugs on said pivoted channels to pivot the outer ends of the channels radially inward and outward to change the radial position of the channels radially inward and outward to change the radial position of the outer ends of the pivoted channels to thereby change the radial position of the grain traveling off the outer ends of the pivoted channels.

2. A grain spreader according to claim 1 wherein said means to raise and lower said plate comprising threaded rod means threadably mounted vertically through the cone with means to rotate the rod means at the top and means supporting the plate on the bottom.

* * * * *